MAGNETIC MEMORY

Filed May 31, 1960

INVENTORS
GEORGE R. BRIGGS &
RABAH SHAHBENDER
BY John V. Regan
ATTORNEY

MAGNETIC MEMORY

Filed May 31, 1960 2 Sheets-Sheet 2

INVENTORS
GEORGE R. BRIGGS &
RABAH SHAHBENDER
BY John V. Regan
ATTORNEY

United States Patent Office 3,183,579

Patented May 18, 1965

3,183,579
MAGNETIC MEMORY

George R. Briggs, Princeton, and Rabah Shahbender, Berlin, N.J., assignors to Radio Corporation of America, a corporation of Delaware Filed May 31, 1960, Ser. No. 33,021
12 Claims. (Cl. 29—155.5)

The objective of this invention is to provide a new and improved magnetic memory structure and a new and improved method for fabricating this structure.

A memory element or cell according to the invention may be made by applying an insulator on a sheet of magnetic material; forming one or more conductors on the insulator; applying a second insulator over the conductors; placing an element formed of sheet magnetic material over the second insulator; and forming magnetic connections as, for example, by welding, between the magnetic element and magnetic layer in such manner that a closed magnetic path is formed through which one or more of the conductors pass. A memory plane is made up of a large number of memory elements such as described above with the sheet of magnetic material common to all such elements.

The memory of the invention has a number of important advantages. For example, as contrasted to so-called thin film magnetic memories in which the magnetic material is deposited by electrodeposition, chemical deposition or other means onto a substrate, the sheets of magnetic material of which the magnetic elements of the invention are made have much more uniform and reproducible magnetic properties. Nevertheless, the magnetic sheets may be quite thin and the closed magnetic path or paths formed may be quite small. Accordingly, the memory is capable of relatively high operating speed with small exciting currents. Moreover, the magnetic material of which the magnetic elements of the invention are made is commercially available in large sheets and these sheets are highly uniform, sheet-to-sheet, in thickness, composition and magnetic properties. Another advantage of the memory of the invention is that it is relatively inexpensive and is easy to fabricate. Another advantage is that high packing densities are possible. For example, the memory elements or cells of the invention may be spaced 20 to 25 mils or less apart so that there may be 40 or more cells per linear inch and 1600 or more cells per square inch of memory plane. The sheets of each plane may be placed fairly close to one another to give a volumetric density of 100,000 or more memory elements per cubic inch. Finally, the memory of the invention is adaptable for different modes of operation as, for example, word organized, coincident current and so on.

The invention is illustrated in the drawings listed below and is described in greater detail in the description following the drawing list.

Figure 1:
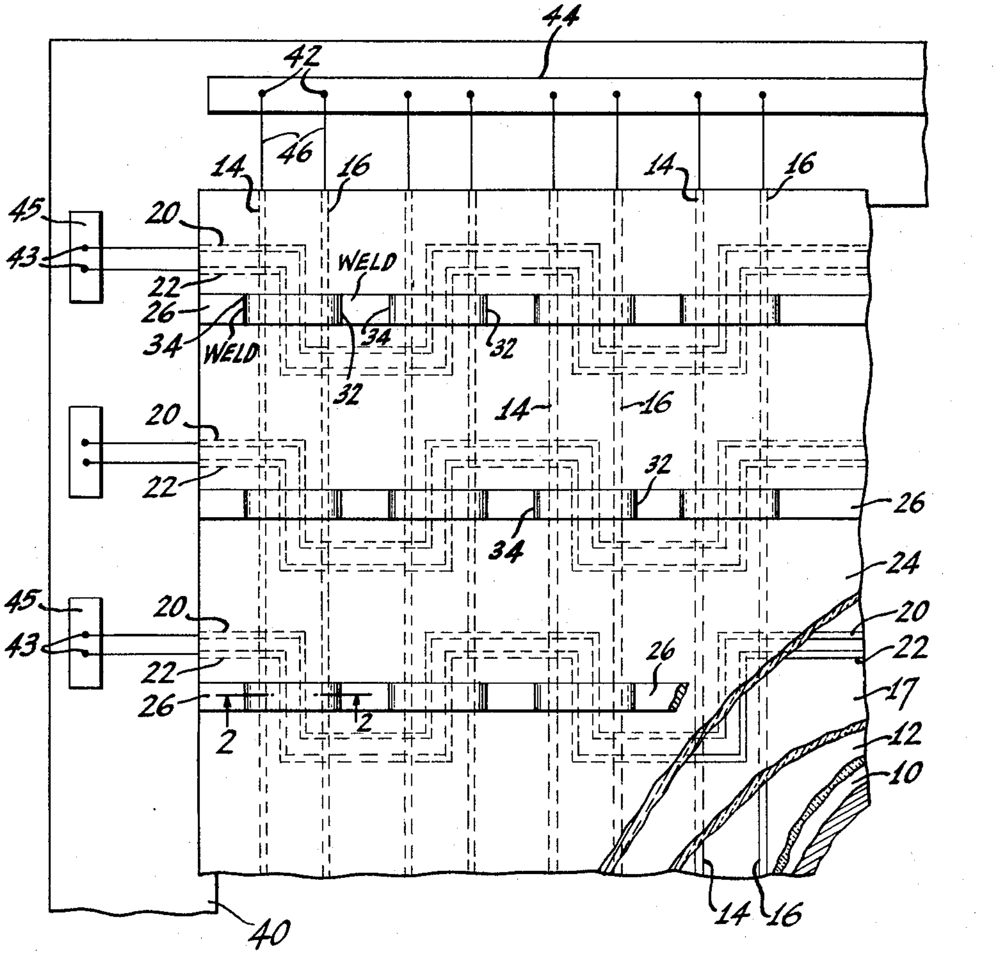
FIG. 1 is a plan view of a portion of a memory structure according to the invention.
Figure 2:
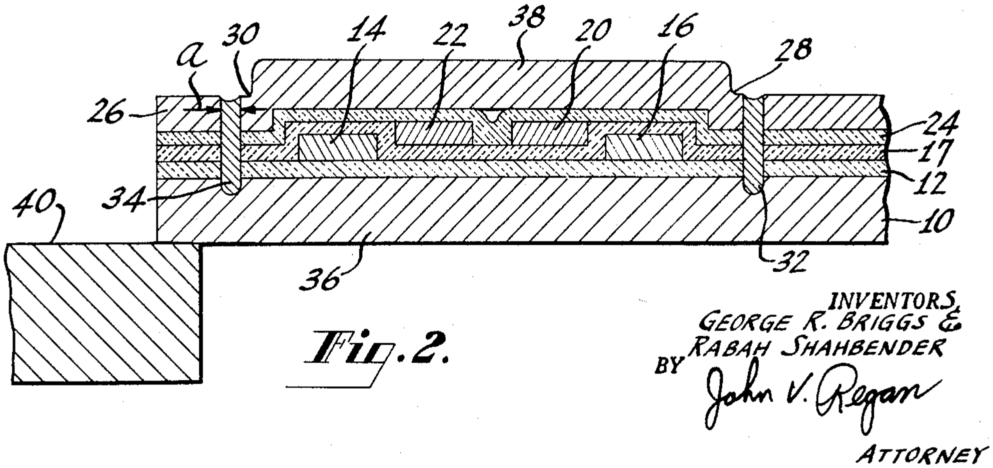
FIG. 2 is a partial cross-sectional view along line 2—2 of FIG. 1.

In the explanation which follows the memory structure and ways of making the memory structure are described. FIGS. 1 and 2 should be referred to first. Element 10 is a sheet of magnetic material such as permalloy. In one form of memory, a layer of insulating material 12 such as epoxy resin, silicone rubber, or a high temperature resistant material such as silicon monoxide, silicon dioxide or other oxide of silicon is sprayed or otherwise formed on the permalloy.

Above the insulator layer 12 are one or more conductors. Two such conductors 14 and 16 are illustrated in FIGS. 1 and 2, however, the invention is not restricted to this particular number of conductors. As will be explained in more detail later, the conductors may be applied by any one of a number of well-known techniques such as vapor deposition or spraying through masks, photoengraving, electrochemical plating, and so on.

A second layer of insulating material 17, which may be similar to the first layer 12, is located over the conductors 14 and 16 and one or more additional conductors may be placed on this second layer. In the embodiment of FIGS. 1 and 2, two such conductors 20 and 22 are shown. Again, more or fewer than two conductors may be used and, in some applications, the conductors can all be on the first insulator layer and the third layer 24 omitted. For the sake of drawing simplicity, the conductors 20 and 22 are shown between conductors 14 and 16, however, it is to be understood that conductors 20 and 22 may be directly over the conductors 14 and 16. A third layer of insulating material 24, which may be similar to the insulating layers 12 and 17, insulates conductors 20 and 22.

The last element in the structure is a magnetic element 26 which, in the embodiment of FIGS. 1 and 2, is in the form of a narrow strip. This strip is made of sheet material and is appropriately bent or corrugated to fit over the conductors imbedded in the insulator as is indicated more clearly in FIG. 2. The upper magnetic element 26 may then be welded to the magnetic sheet 10 right through the three insulator layer. Alternatively, the insulation can be removed from the region to be welded prior to the welding step. The weld itself is of magnetic material and it may be formed by various means. As one example, an electron beam device has been found to be especially suitable. A suitable electron beam device is described in American Machinist, February 23, 1960, and March 9, 1960, issues. The weld is made close to the bends 28 and 30 and preferably extends across the entire strip as is shown at 32 and 34 in FIG. 1. The width of the weld (dimension *a* in FIG. 2) may be as small as 0.001 inch (for electron beam welds) or as wide, as desired, say 0.05 inch or even greater. A cross-sectional schematic showing of the weld appears at 32 and 34 in FIG. 2.

The cross-sectional view of FIG. 2 shows a magnetic cell according to the invention which includes four windings (14, 16, 20, and 22). The cell includes a lower magnetic part 36 formed of the sheet of magnetic material, an upper magnetic part 38 formed of the strip 26 of magnetic material and two side magnetic parts 32 and 34 formed of the welds. Thus, there is a closed magnetic path around which remanent magnetic flux may be produced in one direction or the other. The magnetic material is of the type having two stable magnetic remanent states, for example, 4–79 molybdenum permalloy.

A portion of a complete memory is shown in FIG. 1. There are 16 closed magnetic paths shown, each with four windings through the path. The permalloy sheet may be fixed to a frame 40 for mechanical support. In embodiments of the invention in which the memory need not be annealed after it is welded, the frame 40 may be a sheet of Bakelite or similar material without a cut-out center portion and the permalloy sheet 36 may be attached to the Bakelite with an adhesive. In embodiments of the invention in which annealing is necessary after the welding, it is preferred that the frame be as shown (with a cut-out center portion) and have substantially the same coefficient of thermal expansion as the sheet 36 so that no stresses are introduced during the cooling period following the annealing step. In these embodiments, the frame 40 may be made of permalloy between 10 and 50 mils thick or other similar material.

In addition to supporting the memory, the frame forms a convenient place for mounting input and output terminals, some of which are shown at 42 and 43. These may be insulated from the frame, if the latter is a conductor, by insulating terminal boards 44 and 45. Leads 46 connect to the conductors or windings of the memory.

Figure 3:
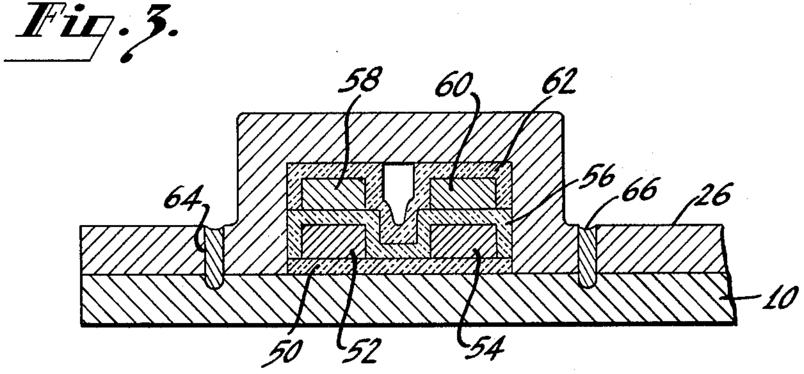
FIG. 3 is a cross-sectional view through another form of magnetic memory according to the present invention.

A somewhat different memory construction is shown in cross-section in FIG. 3. (The plan view of the memory is not shown but is somewhat similar to that shown in FIG. 1.) The layers of insulating material, rather than being applied over the entire sheet 10 of magnetic material, are applied instead in strips. This makes the final step of welding the strip of magnetic material to the sheet of magnetic material easier as the two members are in contact with one another and the weld need not be through an insulator.

The structure of FIG. 3 includes a sheet 10 of substantially square loop magnetic material and a first insulator layer 50 in the form of a strip formed on the sheet. A pair of conductors 52 and 54 are formed on the insulator 50. A second insulator layer 56 is then applied over the conductors. A second pair of conductors 58 and 60 is then formed on the second insulator layer 56. The third insulator layer 62 covers the conductors 58 and 60. The final element of the cell is the strip 26 of magnetic material and this is welded at 64 and 66 to the sheet 10.

There are various materials which are suitable for the various elements of the memories described above. For example, member 10 may be a rolled permalloy sheet of from about .05 to 2 mils or more in thickness. A standard 4–79 molybdenum permalloy is suitable as are a number of other alloys of standard compositions. The number indicates 79% nickel, 4% molybdenum and the balance iron. Alternatively, the sheet 10 may be a commercially available product known as Orthonol which is composed of 50% nickel and 50% iron. As another alternative, the sheet may be of a square-loop material such as 16 ALFenol, a commercially available product consisting of 16% aluminum and the rest iron. This material can be annealed in air rather than the dry hydrogen used for other materials.

The various insulating layers which are used will depend, as is explained in more detail below, upon the method used to construct the memory and especially upon whether the annealing is done before or after welding (both techniques are possible). In the latter case, the insulating material should be heat resistant. The thickness of the insulating layer is not critical but may be from $\frac{1}{10}$ of a mill or less to a mill or more. Silicon monoxide may be even thinner, perhaps down to several thousand Angstroms in thickness or less.

The conductors may be formed of copper, or any one of a number of other conductors including the same magnetic metals as the sheets. Copper is preferred because it is relatively cheap and easy to work with. The cross-sectional area of the conductor is not critical but should be sufficiently large so that excessive heat due to current flow through the conductor does not occur. As an example, the conductor may be one to two mils in width and perhaps one to two mils in thickness.

The final layer of magnetic material such as 26 in FIG. 1 is preferably formed of the same material as the sheet 10 of magnetic material; however, this is not essential. The thickness of the strip 26 may also be similar to that of the sheet 10, i.e., in range of .05 mil to two mils or more. As already mentioned, the strip 26 may be bent to appropriate shape as, for example, by a metal stamping press. If desired, the strips can be cut out and stamped from a sheet of material such as 10. The strips may be annealed after they are stamped out and before they are welded to sheet 10. Alternatively, the strips may be annealed after they are welded in place provided that the insulation and windings can withstand the annealing temperature (900° C. is usual).

Figure 4:
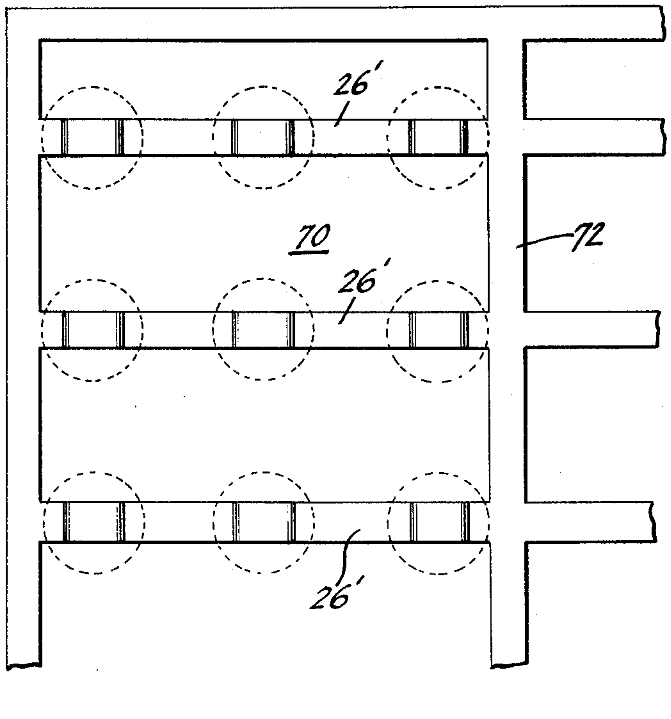
FIG. 4 is a drawing of a modification of a portion of the memory such as shown in FIG. 1 or 3.

Another possible configuration for the upper magnetic member analogous to the strips 26 of FIG. 1 is shown in FIG. 4, the areas within dashed lines being those bent to form the upper part of the core. Areas such as 70 are cut outs. Cross pieces such as 72 are for the purpose of holding the strips 26′ together.

In another form of the invention, the upper magnetic member of the memory need not have cut outs at all. It can be stamped in a press to form a corrugated sheet shaped somewhat like the surface of a waffle with appropriate places indented to fit over the windings and other places in which the cells fit stamped in the opposite direction.

In another form of the invention, the upper magnetic member of the memory can be a sheet just like sheet 10. With a memory of this type it is possible to apply to the lower sheet 10 an insulating layer, windings on the insulating layer, and another insulating layer, and to the upper sheet an insulating layer and windings. The upper and lower magnetic sheets may then be clamped together so that they are close to one another in the areas to be welded such as 34, 32 (FIG. 2) and then welded. The cross-sectional view of such a memory may be like the one shown in FIG. 2. Alternatively, the insulation may be applied in strips or may be removed from the areas to be welded so that the memory can appear in cross-section as is shown in FIG. 3.

In the embodiments of the invention shown in FIGS. 2 and 3, the final insulation layer (62 in FIG. 2) is applied over the conductors (20 and 22 in the case of FIG. 2, and 58 and 62 in the case of FIG. 3). An alternative method of construction is possible. The insulation may instead be applied to the upper strip 26 of magnetic material in the strip areas which are close to the exposed conductors and the strip may then be welded as already described.

One method of fabricating a memory such as shown in FIG. 3 is as follows. A one mil sheet of rolled 4–79 molybdenum permalloy of appropriate size is annealed in an oven at 900° C. for 10 minutes or so and then cooled to room temperature. The annealing step is necessary in this instance to impart the desired square loop characteristics to the permalloy.

A mask is then applied to the permalloy sheet so that the insulation can be sprayed onto the sheet in the form of narrow strips such as 50 in FIG. 3. An insulating material such as a silicone rubber known as RTV and commerically available from General Electric or Dow-Corning is then sprayed onto the permalloy sheet 10 through the mask. A catalyst may be mixed with the silicone rubber so as to vulcanize the rubber during the hardening process. Alternatively, the silicone rubber may be sprayed on first and the catalyst afterwards. The mask may then be removed and the insulation baked at about 200° C. for about five minutes to aid the curing of the insulation. The insulation is then allowed to cool.

After the insulation is cooled, conductors 52 and 54 (FIG. 3) are applied over the insulation. A number of different ways of doing this are possible. One is to vacuum evaporate a thin layer of copper onto the strip through a mask. In this method, the copper and masked, insulated, permalloy sheet 10 are placed in a vacuum, the copper is heated to its boiling point, and the evaporated copper plates out onto the insulator through the mask. In order to save time (vacuum evaporation is a relatively slow process), the copper may be evaporated on in a very thin layer of, say 5,000 Angstroms or less. Subsequently, additional copper may be plated onto the thin conductor to build up its thickness by a standard electrodeposition process. The electrolyte for this process, for example, may be copper sulphate or a more complex standard commercial solution. The electrodeposition is continued until the copper is of a desired thickness such as 0.1 mil to one or two mils.

As an alternative, a standard photoengraving technique may be used to form the conductors. In this technique, the entire surface is covered with a copper layer by any standard method such as spraying, electrodeposition, vacuum evaporation plus electrodeposition, or any other quick method. Then the copper is covered, by spraying, with a photoresist on which an image may be developed such as "Kodak Photo Resist" (KPR). Then, by photographic methods, an image of the desired winding configuration is developed on the KPR. The portion of the KPR exposed to light hardens so that the remainder of the KPR may easily be washed away. The copper thereby uncovered is next etched away leaving the desired winding configuration.

The second insulator layer 56, the conductors 58 and 60, and the third insulator layer 62 may be applied in a manner similar to that already described. After all conductors and insulators are formed on the permalloy sheet, the permalloy strip is applied. This strip may be cut from a sheet of rolled material similar to the sheet 10. The strip is then bent into the configuration shown in FIG. 3 as, for example, by a press. It is then annealed similarly to the annealing of the permalloy sheet 10 to produce the desired magnetic characteristics. Then, all of the strips are held in place by means of a jig. Alternatively, a magnetic field may be applied to the lower sheet 10 so that the permalloy strip is held in position. The permalloy strip is then welded to the permalloy sheet by any one of a number of techniques. For example, electrowelding is suitable and, if desired, a welding jig may be employed for welding all areas to be welded simultaneously. Alternatively, ultrasonic welding may be employed. A third alternative is to place the entire structure in a vacuum and weld by a electron beam. This last means has been found to be especially suitable. In this welding method, the electron beam welds a first line such as 34 in FIG. 1 and then a second line such as 32 in FIG. 1 by suitably deflecting the electron beam. The memory structure is then physically moved and two other lines such as 34' and 32' are welded, and so on. With modern electron beam welding equipment, it is possible to pre-program the movement of the permalloy sheet so as to automatically weld the various cells in succession.

The method for fabricating a memory such as shown in cross-section in FIG. 2 is similar to the one described above except that the steps of applying the insulating layers are simpler since no masks are needed. However, the welding equipment must be sufficiently powerful to penetrate through three layers of insulation. This is feasible provided the total insulation thickness (the combined thicknesses of 12 and 24 in FIGS. 2 and 4) is not too great and the insulation is of a type which is not destroyed by the beam (silicon monoxide or silicon dioxide are suitable). The thickness of each layer may, for example, be on the order of 1,000 Angstroms so that the three layers together are 3,000 Angstroms thick. It has been found possible to weld right through silicon monoxide layers much thicker than this with the electron beam welding process described above.

In the methods described above, the magnetic material is annealed prior to the time the insulating material and conductors are applied to the permalloy sheet. In an alternative method of construction, the annealing step may be deferred to the last step. However, with this alternative method, the insulating material must have a sufficiently high melting point to withstand an annealing temperature of 900° C. or so for 5 or 10 minutes. Silicon monoxide or silicon dioxide insulators have been found to be suitable. Silicon monoxide can be vacuum evaporated onto the permalloy sheet. Silicon dioxide can be sprayed onto the permalloy sheet. To spray the silicon dioxide, argon gas is bubbled through a drying agent and then through a container having ethylene triethoxy silane. The ethylene triethoxy silane vapors along with the gas are passed through a quartz tube with a heater coil inside it. The gas and vapors are heated at 650° C. at which temperature the silane decomposes into silicon dioxide plus other gases. A vent at the end of the tube permits the gases to escape, whereupon the silicon dioxide deposits onto the permalloy sheet placed under the vent.

Annealing as the last step in making a memory has some advantages. The final heating step for annealing the magnetic material, in addition to enhancing the magnetic characteristics of the material, also tends to relieve stresses in the entire memory structure, thereby making it more stable mechanically. Also, currents may be passed through one or more windings during the annealing. These currents generate a magnetic field which causes the magnetic material to have squarer-loop magnetic characteristics during memory operation. One material which has been found to give especially good performance when treated this way is 65% nickel-iron. On the other hand, there are advantages in pre-annealing. One is that it permits one to use relatively low melting point insulators which are both easy to work with and have good insulating properties.

What is claimed is:

1. In a method of making a memory, the steps of applying an insulator on a sheet of substantially square loop magnetic material; forming at least a single conductive lead on the insulator; applying a second insulator over the conductive lead and insulator so as to insulate the lead; placing an element formed of sheet substantially square loop magnetic material over the insulated conductive lead; and melting restricted areas of the magnetic material to form permanent magnetic connections between the element and the sheet of magnetic material in such manner that a continuous, closed path of magnetic material is formed through which the lead passes.

2. A method as set forth in claim 1, in which the insulator is sprayed onto the sheet of magnetic material and conductive lead, respectively.

3. A method as set forth in claim 1, in which the insulator is vacuum evaporated onto the sheet of magnetic material and conductive lead, respectively.

4. A method as set forth in claim 1, in which the conductive lead is applied by vacuum evaporating a conductor onto the insulator through a mask.

5. A method as set forth in claim 1, in which the conductive lead is applied by photoengraving the lead onto the insulator.

6. A method of making a memory comprising the steps of applying a strip shaped length of insulator material to a sheet of magnetic material; forming at least a single conductive lead on said insulator strip; applying a second insulator strip over the conductive lead and first insulator strip so as to insulate the lead; placing over the insulated lead and at an angle to it a strip shaped length of sheet magnetic material which has the same magnetic properties as the first-mentioned magnetic material and is arranged so that when the strip is in place it abuts the sheet of magnetic material on each side of the conductive lead; and welding the strip to the sheet of magnetic material on each side of the conductive lead where the strip abuts the sheet of magnetic material to form a continuously closed path of magnetic material through which the insulated lead passes.

7. A method of making a memory comprising the steps of applying an insulator over one entire surface of a sheet of magnetic material; forming at least one conductive lead on the insulator; applying a second insulator over the conductive lead and the exposed surface of the first insulator so as to insulate the conductive lead; placing a strip shaped length of magnetic material which has the same magnetic properties as the first-mentioned magnetic material over the insulated conductive lead and at an angle to it; and welding the magnetic element to the sheet of magnetic material through the insulator layers, on each side of the conductive lead to form a continuous, closed path of magnetic material through which the lead passes.

8. A method of making a memory comprising the steps of applying an insulator on a sheet of substantially square loop magnetic material; forming at least a single conductor on the insulator; applying a second insulator over the conductor and insulator to insulate the conductor; placing an element formed of substantially square loop magnetic material over the insulated conductor; and welding said element to the sheet of magnetic material on each side of the conductor so that a continuous, closed path of magnetic material is formed through which the conductor passes.

9. A method of making a memory comprising the steps of applying an insulator on a sheet of magnetic material; forming at least a single conductor on the insulator; applying a second insulator over the conductor and insulator so as to insulate the conductor; placing an element formed of magnetic material which has the same magnetic properties as the first-mentioned magnetic material over the insulated conductor; and, in a vacuum, directing an electron beam at a portion of the element on each side of the conductor so as to weld the element to the sheet of magnetic material and form a continuous, closed path of magnetic material through which the conductor passes.

10. A method of making a magnetic memory comprising the steps of forming a plurality of insulated, conductive leads which lie side-by-side over at least one portion of their extent on a sheet of magnetic substantially square loop material; and welding a member of substantially square loop magnetic material which passes over the leads where they lie side-by-side to the sheet to form a continuous, closed path of magnetic material through which the conductors pass.

11. A method of making a memory comprising the steps of applying an insulator on a sheet of magnetic material; forming at least a single conductive lead on the insulator; applying a second insulator over the conductive lead and insulator so as to insulate the lead; placing an element formed of sheet magnetic material which has the same magnetic properties as the first-mentioned magnetic material over the insulated conductive lead; melting restricted areas of the magnetic material to form permanent magnetic connections between the element and the sheet of magnetic material in such manner that a continuous, closed path is formed through which the lead passes; and annealing the memory thus made in order to improve the magnetic properties of the sheet and element of magnetic material.

12. A method of making a memory comprising the steps of annealing a sheet of square loop magnetic material so as to enhance its magnetic properties; applying an insulator on the sheet of magnetic material; forming at least a single conductive lead on the insulator; applying a second insulator over the conductive lead and insulator so as to insulate the lead; annealing an element formed of sheet of square loop magnetic material in order to enhance the magnetic properties of that element; placing the annealed magnetic element over the insulated conductive lead; and melting restricted areas of the magnetic material to form magnetic connections between the element and the sheet of magnetic material in such manner that a continuous, closed path of magnetic material is formed through which the lead passes.

References Cited by the Examiner

UNITED STATES PATENTS

| | | | |
|---|---|---|---|
| 2,676,392 | 4/54 | Buhrendorf | 29—155.5 |
| 2,721,822 | 10/55 | Pritikin | 29—155.5 |
| 2,877,540 | 3/59 | Austen | 29—155.5 |
| 2,878,463 | 3/59 | Austen | 340—174 |
| 2,911,627 | 11/59 | Kilburn et al. | 29—155.5 |
| 2,919,432 | 12/59 | Broadbent | 340—174 |
| 2,961,745 | 11/60 | Smith | 29—155.5 |
| 3,041,710 | 7/62 | Geer | 29—155.5 |
| 3,077,021 | 2/63 | Brownlow | 29—155.5 |
| 3,130,134 | 4/64 | Jones | 29—155.5 |
| 3,138,785 | 6/64 | Chapman | 29—155.5 |

IRVING L. SRAGOW, *Primary Examiner.*

EVERETT R. REYNOLDS, *Examiner.*